US007673614B2

(12) United States Patent
Inada et al.

(10) Patent No.: US 7,673,614 B2
(45) Date of Patent: Mar. 9, 2010

(54) INTERNAL-COMBUSTION-ENGINE COMBUSTION CONDITION DETECTION APPARATUS AND COMBUSTION CONDITION DETECTION METHOD

(75) Inventors: Takahiko Inada, Chiyoda-ku (JP); Kimihiko Tanaya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/171,798

(22) Filed: Jul. 11, 2008

(65) Prior Publication Data

US 2009/0173315 A1 Jul. 9, 2009

(30) Foreign Application Priority Data

Jan. 9, 2008 (JP) ............................ 2008-002181

(51) Int. Cl.
*F02P 5/00* (2006.01)
*F02P 3/05* (2006.01)
*G01M 15/00* (2006.01)
*G01L 23/22* (2006.01)
*F02P 17/00* (2006.01)

(52) U.S. Cl. ............................ 123/406.26; 73/114.67; 73/35.08; 324/378; 123/644

(58) Field of Classification Search ................ 73/35.08, 73/114.62, 114.67; 123/644, 406.26, 310, 123/169 R; 701/105, 114; 324/378, 459
See application file for complete search history.

(56) References Cited

U.S. PATENT DOCUMENTS 5,561,239 A * 10/1996 Yasuda ...................... 73/35.08
5,751,147 A * 5/1998 Nakata et al. ............... 324/399
6,691,555 B2 * 2/2004 Ohkama et al. ............ 73/35.08
7,451,640 B2 * 11/2008 Asano et al. ............. 73/114.67
2009/0099722 A1 * 4/2009 Tanaya ........................ 701/29

FOREIGN PATENT DOCUMENTS

JP 07-217519 A 8/1995
JP 09-317620 A 12/1997

* cited by examiner

*Primary Examiner*—Stephen K Cronin
*Assistant Examiner*—Sizo B Vilakazi
(74) *Attorney, Agent, or Firm*—Sughrue Mion, PLLC

(57) ABSTRACT

An internal-combustion-engine combustion condition detection apparatus is provided with an ignition means that makes an ignition plug ignite a fuel; an ignition control means that controls the operation of the ignition means; an ion-current detection means that detects an ion current generated; an ion current detection range setting means that sets an ion-current detection range; a preignition detection means that detects preignition within a detection range to be set; a leakage current detection range setting means that sets a leakage-current detection range; and a leakage current determination means that determines whether or not a smolder exists, based on a current detected, within a detection range to be set, by the ion-current detection means. The ignition control means includes a non-combustion-stroke ignition control means; the leakage-current detection range set by the leakage current detection range setting means is set within the non-combustion stroke.

Accordingly, both a smolder detection and a preignition detection can securely be performed.

5 Claims, 12 Drawing Sheets

INTERNAL-COMBUSTION-ENGINE COMBUSTION CONDITION DETECTION APPARATUS AND COMBUSTION CONDITION DETECTION METHOD

BACKGROUND OF THE INVENTION

1. Field of the Invention

The present invention relates to an internal-combustion-engine combustion condition detection apparatus, and more particularly to an internal-combustion-engine combustion condition detection apparatus that can securely determine whether or not an ignition-plug smolder and/or preignition have occurred.

2. Description of the Related Art

In operating an internal combustion engine, in the case where a carbon deposit, which occurs when a mixed gas (fuel-air mixture) in a cylinder imperfectly combusts, adheres to the surface of the insulator for an ignition-plug ignition portion, the value of the insulation resistance across the electrodes of the ignition plug decreases, whereby a spark becomes unlikely to occur.

This phenomenon is commonly known as "soiling of an ignition plug due to smoldering".

In addition, the phenomenon is referred to as "smoldering" in which the value of the insulation resistance across the electrodes of an ignition plug decreases and thereby a leakage current occurs across the electrodes of the ignition plug.

Additionally, due to combustion in a combustion chamber, the molecules of a mixture gas in the combustion chamber ionize, and when a voltage is applied to the ionized combustion chamber through the ignition plug, a minute current flows. The minute current is referred to as an ion current.

To date, it has been known that, in an spark-ignition internal combustion engine, an ion current that occurs in a combustion chamber after the start of ignition through an ignition plug is detected, the driving condition, such as a knock or a combustion limit, of the internal combustion engine is detected through the magnitude of the detected ion current, the time period during which the ion current occurs, or the like, and based on the result of the detection, the ignition timing is adjusted or the amount of a fuel to be injected is corrected.

In such an ion current detection method utilizing an ignition plug, an ion current can be detected each time ignition is executed, as long as no abnormality exists in the ignition plug.

However, as the soiling of an ignition plug due to smoldering advances, the insulation resistance value of the ignition plug remarkably decreases, whereby a leakage current across the electrodes of the ignition plug increases.

Accordingly, a case may occur in which, even when, due to a misfire, no ion current occurs, a leakage current is detected as an ion current, whereby the misfire cannot be detected.

In addition, it is commonly known that soiling due to a carbon deposit has a self-cleaning action in that the soiling occurs when the temperature of an ignition plug is low and the engine is in a state in which the rotation speed is low and the engine load is small, and when the temperature of the ignition plug rises, the carbon deposit that has adhered to the surface of the insulator for the ignition portion of the ignition plug is burned off.

Accordingly, it is an effective method to facilitate increase in the temperature of an ignition plug, in terms of improving smoldering due to carbon-deposit soiling.

Additionally, there exists a phenomenon in which, in driving an internal combustion engine, a hot spot caused by a residual temperature of a carbon deposit that has adhered to an ignition plug or to the inside of a cylinder makes a mixture gas spontaneously catch fire halfway through a compression stroke.

The foregoing phenomenon is referred to as preignition; preignition not only causes a sharp decrease in the output of an internal combustion engine or an imperfect rotation but also damages the internal combustion engine in the worst case.

FIG. 7 is a set of charts for explaining a problem in a conventional preignition detection method, for example, disclosed in Japanese Patent Publication No. 3176291 (Patent Document 1); FIG. 7 represents the relationship between the ion current and the leakage current when preignition occurs.

FIG. 7(*a*) represents a case in which a mixture gas normally catches fire through a discharge from an ignition plug. Firstly, a pulse occurs at each of the rising and the falling timing of an ignition signal; after that noise is caused by a discharge from the ignition plug; then, an ion current (combustion ion current) occurs.

FIG. 7(*b*) represents a case in which preignition occurs and then an ion current flows; the width of the pulse that occurs at the falling timing of the ignition signal is widened.

FIG. 7(*c*) represents a case in which a smolder occurs in the ignition plug; a leakage current flows in a secondary circuit not only as the ignition signal rises but also even after a discharge from the ignition plug.

FIG. 7(*d*) represents a case in which a smolder occurs in the ignition plug and preignition occurs; the respective pulses that occur at the rising and the falling timing of the ignition signal join with each other, whereby a pulse caused by preignition cannot be discriminated.

FIG. 8 is a chart for explaining the conventional preignition detection method disclosed in Patent Document 1.

The respective voltages that occur across a detection resistor at a time instant when a first predetermined time period ts (ts: smolder determination duration) elapses after a pulse-shaped ignition signal has been outputted from an ignition device and at a time instant when a second predetermined time period tp (tp: determination duration for determining whether or not a combustion ion current occurs due to preignition or the like), which is longer than the first predetermined time period, elapses after the pulse-shaped ignition signal has been outputted from the ignition device are read into a microcomputer, as a smolder-detection-timing voltage V(ts) and a preignition-detection-timing voltage V(tp).

In the case where the smolder-detection-timing voltage V(ts) is higher than a predetermined threshold voltage, a smolder has occurred in an ignition plug; therefore, because the smolder may cause an erroneous determination, the determination whether or not preignition has occurred is canceled.

In contrast, in the case where the smolder-detection-timing Voltage V(ts) is the same as or lower than the predetermined threshold voltage, no smolder has occurred in the ignition plug; therefore, because no erroneous determination is performed, determination whether or not preignition has occurred is performed based on the preignition-detection-timing voltage V(tp).

In addition, as represented in FIG. 8, a leakage current starts to occur from an ignition energization start timing; the higher the level of the smolder is, the longer the duration of the leakage current becomes.

Additionally, the higher the level of preignition is, the longer the duration of an ion current caused by preignition becomes in a direction in which the time instant advances.

FIG. 9 is a diagram for explaining the configuration and the operation of a conventional ion-current detection device.

In FIG. 9, reference numeral 100 denotes an ignition plug; reference numeral 100*a* denotes an ion current that occurs in a combustion chamber; reference numeral 100*b* denotes a resistor (a smolder resistor) that is formed of a carbon deposit that occurs across the electrodes of the ignition plug 100 when a mixture gas imperfectly combusts. A leakage current flows through the smolder resistor 100*b*.

Reference numerals 201, 20, 20*a*, 20*b*, 30, and 41 denote an ignition device, an ignition coil, a primary coil of the ignition coil 20, a secondary coil, a transistor, and an ion-current detection device, respectively.

In the ion-current detection device 41, reference numerals 42, 43, 44, and 45 denote a capacitor, a diode, a zener diode, and an ion current shaping circuit, respectively.

The ignition plug 100 is provided in the combustion chamber and connected to the negative-polarity end of the secondary coil 20*b* of the ignition coil 20. The positive-polarity end of the primary coil 20*a* is connected to a power source, and the negative-polarity end thereof is connected to the collector of the transistor 30 for current switching.

The emitter of the transistor 30 is connected to the ground, and the base thereof is connected to an ECU (control device) 301 that controls combustion.

The ion-current detection device 41 is configured with the capacitor 42 connected to the positive-polarity end of the secondary coil 20*b*, the diode 43 connected between the lower-potential end of the capacitor 42 and the ground, the zener diode 44 that determines a voltage that is charged across the capacitor 42, and the ion current shaping circuit 45.

In addition, the ion-current detection device 41, configured with the capacitor 42, the diode 43, and the zener diode 44, detects an ion current, based on electric charges accumulated across the capacitor 42.

Additionally, the ion current shaping circuit 45 converts an ion current detected by the ion-current detection device 41 into a voltage and filters out noise components of a voltage-converted signal so as to shape the waveform thereof.

FIG. 10 is a set of charts representing the worst case of the relationship between the leakage current due to a smolder and the ion current when preignition is detected.

FIG. 10(*a*) represents an ignition signal, and FIG. 10(*b*) represents a secondary voltage that occurs across the secondary coil 20*b* of the ignition coil 20.

The ignition signal is applied to the base of the transistor 30 illustrated in FIG. 9; at the time instant when a current starts to flow through the primary coil 20*a*, an induction voltage of several kilovolts (e.g., approximately 1 kV) occurs across the secondary coil 20*b;* after that, the value (in this case, 140V) of the voltage across the zener diode 44 is determined by the voltage charged across the capacitor 42.

FIG. 10(*c*) represents a leakage current caused by a low-level smolder; unlike the state represented in FIG. 7(*c*), in the case where a low-level smolder occurs, a leakage current disappears halfway in the duration of the ignition signal.

Accordingly, in the case where a low-level smolder occurs, a leakage current can be detected only in the first half of the duration of the ignition signal, which is a short duration.

FIG. 10(*d*) represents an ion current when preignition occurs; FIG. 10(*d*) represents a case in which more runaway preignition occurs than in FIG. 7(*b*).

FIG. 10(*e*) represents the compression stroke range and the expansion stroke range of an internal combustion engine.

FIG. 11 is a diagram conceptually illustrating the configuration of an internal-combustion-engine combustion condition detection apparatus utilizing a conventional ion-current detection device.

In FIG. 11, reference numeral 100 denotes an ignition plug; reference numeral 201 denotes an ignition device that ignites by use of the ignition plug 100 a fuel-air mixture taken in for performing combustion when the internal combustion engine is operated.

Reference numeral 311 denotes an ignition control device that generates a control signal for controlling the operation of the ignition device 201.

Reference numeral 303 denotes an A/D converter that converts an ion current detected by the ion-current detection device 41 illustrated in FIG. 9 or a leakage current into a digital signal.

Reference numeral 314 denotes a leakage current detection range setting device that sets an ignition-plug smolder detection range; reference numeral 315 denotes a leakage current determination device that determines whether or not an ignition-plug smolder exists, based on a current detected within a detection range set by the leakage current detection range setting device 314; reference numeral 316 denotes an ion current detection range setting device that sets an ion-current detection range; reference numeral 317 denotes a preignition detection device that detects preignition or a precursor phenomenon of preignition, based on an ion current within a detection range set by the ion current detection range setting device 316.

In addition, reference numeral 301 denotes an ECU that is a control device.

FIG. 12 is a chart for explaining the timings for a smolder determination and a preignition determination in the foregoing conventional internal-combustion-engine combustion condition detection apparatus.

As represented in FIG. 12 or FIG. 8, to date, a smolder determination has been performed in the first half of the duration of an ignition signal, and a preignition determination has been performed in the second half of the duration of the ignition signal.

In other words, the leakage current detection range setting device 314 sets a leakage-current detection range in the first half of the duration of an ignition signal, and the ion current detection range setting device 316 sets a preignition detection range in the second half of the duration of the ignition signal.

In addition, in FIG. 12, "A" indicates a leakage-current detection range for a smolder determination, and "B" indicates an ion-current detection range for a preignition determination.

In a conventional internal-combustion-engine combustion condition detection apparatus, a smolder determination (i.e., a determination whether or not a leakage current exists) is performed in the first half of the duration of an ignition signal, and a preignition determination is performed in the second half of the duration of the ignition signal.

However, a leak current starts to occur from an ignition energization start timing; the higher the level of a smolder is, the longer the duration of the leak current becomes.

Additionally, the higher the level of preignition is, the longer the duration of an ion current caused by preignition becomes in a direction in which the time instant advances.

Therefore, the duration of a leakage current caused by a smolder and the duration of a combustion ion current caused by preignition or the like may overlap each other; in this case, neither a smolder detection nor a preignition detection can securely be performed.

Moreover, because the leakage-current detection range for a smolder determination and the ion-current detection range for a preignition determination cannot be set wide, it is difficult to raise the determination accuracy.

SUMMARY OF THE INVENTION

The present invention has been implemented in order to solve the foregoing problems; the objective thereof is to provide an internal-combustion-engine combustion condition detection apparatus or an internal-combustion-engine combustion condition detection method with which not only can both a smolder detection and a preignition detection be securely performed, but also the determination accuracy can be raised.

An internal-combustion-engine combustion condition detection apparatus according to the present invention is provided with an ignition means that makes an ignition plug ignite a fuel-air mixture taken into a combustion chamber; an ignition control means that generates a control signal for controlling operation of the ignition means; an ion-current detection means that detects an ion current that occurs when the fuel-air mixture combusts; an ion current detection range setting means that sets a detection range for an ion current to be detected by the ion-current detection means; a preignition detection means that detects preignition or a precursor phenomenon of preignition, based on an ion current detected within a detection range set by the ion current detection range setting means; a leakage current detection range setting means that sets a detection range for a leakage current caused by an ignition-plug smolder; and a leakage current determination means that determines whether or not an ignition-plug smolder exists, based on a current detected, within a detection range set by the leakage current detection range setting means, by the ion-current detection means.

The ignition control means includes a non-combustion-stroke ignition control means that makes the ignition plug perform ignition during a fuel-air mixture non-combustion stroke; the leakage-current detection range set by the leakage current detection range setting means is set within the non-combustion stroke.

An internal-combustion-engine combustion condition detection method according to the present invention is provided with an ignition step of making an ignition plug ignite a fuel-air mixture taken into a combustion chamber; an ignition control step of generating a control signal for controlling operation in the ignition step; an ion-current detection step of detecting an ion current that occurs when the fuel-air mixture combusts; an ion current detection range setting step of setting a detection range for an ion current to be detected in the ion-current detection step; a preignition detection step of detecting preignition or a precursor phenomenon of preignition, based on an ion current detected within a detection range set in the ion current detection range setting step; a leakage current detection range setting step of setting a detection range for a leakage current caused by an ignition-plug smolder; and a leakage current determination step of determining whether or not an ignition-plug smolder exists, based on a current detected, within a detection range set in the leakage current detection range setting step, by the ion-current detection step.

The ignition control step includes a non-combustion-stroke ignition control step of making the ignition plug perform ignition during a fuel-air mixture non-combustion stroke; the leakage-current detection range set in the leakage current detection range setting means is set within the non-combustion stroke.

In the present invention, because the leakage-current detection range is set within the non-combustion stroke that is different from the ion-current detection range, both the smolder detection and the preignition detection can securely be performed.

Moreover, because the leakage-current detection range and the ion-current detection range can be set wide, the accuracies of the smolder determination and the preignition determination can be raised.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
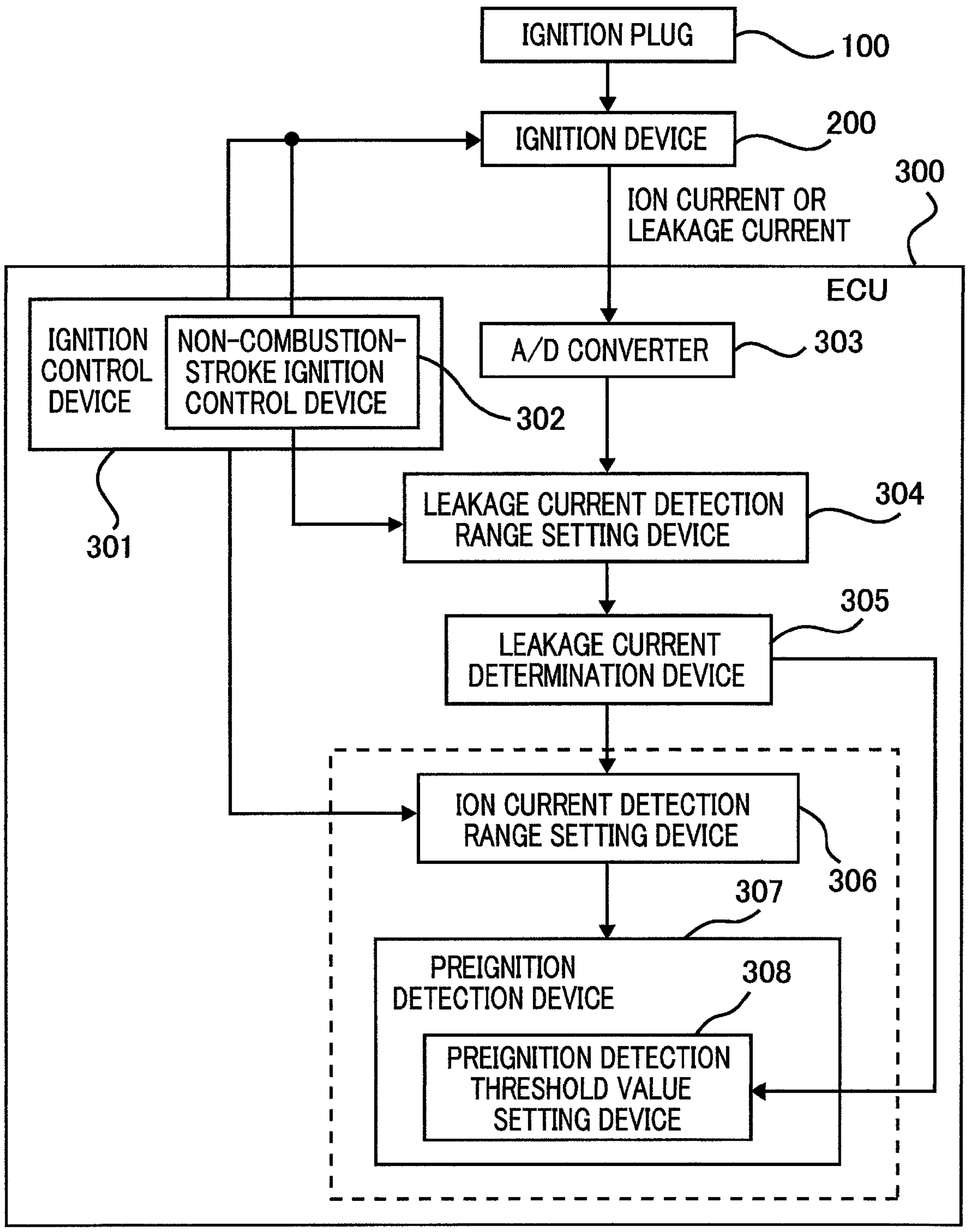
FIG. 1 is a diagram illustrating the configuration of an internal-combustion-engine combustion condition detection apparatus according to Embodiment 1.

Embodiments of the present invention will be explained below with reference to the accompanying drawings.

In addition, the same reference characters in the figures denote the same or equivalent constituent elements.

Embodiment 1

FIG. 1 is a diagram illustrating the configuration of an internal-combustion-engine combustion condition detection apparatus according to Embodiment 1 of the present invention.

In FIG. 1, reference numeral 100 denotes an ignition plug; reference numeral 200 denotes an ignition device (ignition means) that ignites by use of the ignition plug 100 a fuel-air mixture taken into a combustion chamber when the internal combustion engine is operated.

Reference numeral 300 denotes an ECU that controls a combustion condition detection apparatus according to Embodiment 1, excluding the ignition device 200.

Reference numeral 301 denotes an ignition control device (ignition control means) that generates a control signal for controlling the operation of the ignition device 200.

Reference numeral 302 denotes a non-combustion-stroke ignition control device (non-combustion-stroke ignition control means) that is provided in the ignition control device (ignition control means) 301 and makes the ignition plug 100 discharge during a fuel-air mixture non-combustion stroke.

Reference numeral 303 denotes an A/D converter (A/D conversion means) that converts an ion current detected by an ion-current detection device (ion-current detection means) 40 described later or a leakage current into a digital signal.

Reference numeral 304 denotes a leakage current detection range setting device (leakage current detection range setting means) that sets an ignition-plug smolder detection range; reference numeral 305 denotes a leakage current determination device (leakage current determination means) that determines whether or not an ignition-plug smolder exists, based on a current detected within a detection range set by the leakage current detection range setting device 304; reference numeral 306 denotes an ion current detection range setting device (ion current detection range setting means) that sets an ion-current detection range; reference numeral 307 denotes a preignition detection device (preignition detection means) that detects preignition or a precursor phenomenon of preignition, based on an ion current within a detection range set by the ion current detection range setting device 306.

In addition, a preignition detection threshold value setting device (preignition detection threshold value setting means) 308 will be described later.

Figure 2:
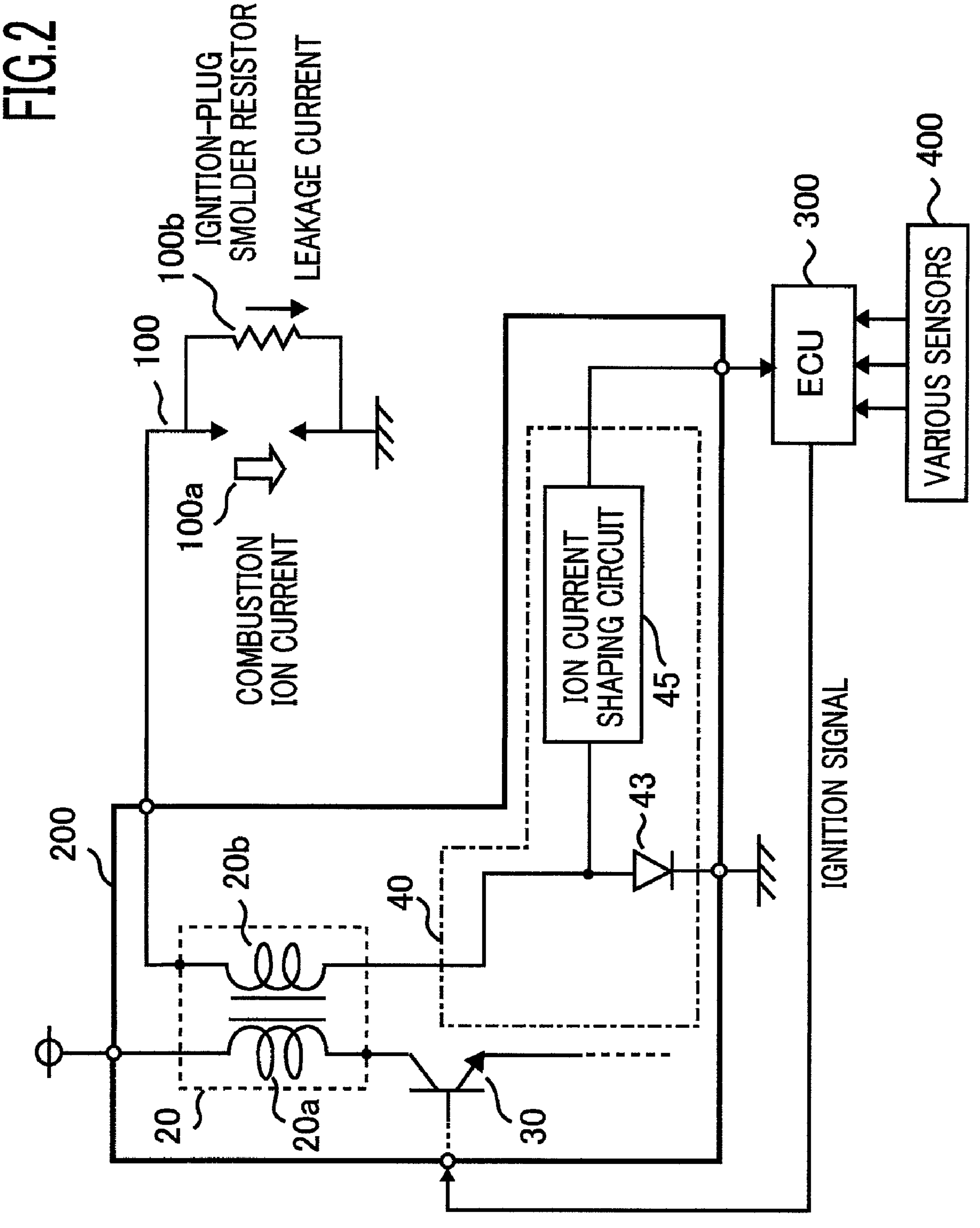
FIG. 2 is a diagram for explaining the configuration and the operation of an ion-current detection device according to Embodiment 1.

FIG. 2 is a diagram for explaining the configuration and the operation of an ion-current detection device (ion-current detection means) according to Embodiment 1.

In FIG. 2, reference numeral 100 denotes an ignition plug; reference numeral 100*a* denotes an ion current that occurs in a combustion chamber; reference numeral 100*b* denotes a resistor (a smolder resistor) that is formed of a carbon deposit that occurs across the electrodes of the ignition plug 100 when a mixture gas imperfectly combusts. A leakage current flows through the smolder resistor 100*b*.

Reference numeral 200 denotes an ignition device (ignition means); reference numeral 20 denotes an ignition coil; reference numeral 20*a* denotes a primary coil of the ignition coil 20; reference numeral 20*b* denotes a secondary coil; reference numeral 30 denotes a transistor; reference numeral 40 denotes an ion-current detection device (means).

In the ion-current detection device (ion-current detection means) 40, reference numerals 43 and 45 denote a diode and an ion current shaping circuit, respectively.

Figure 9:
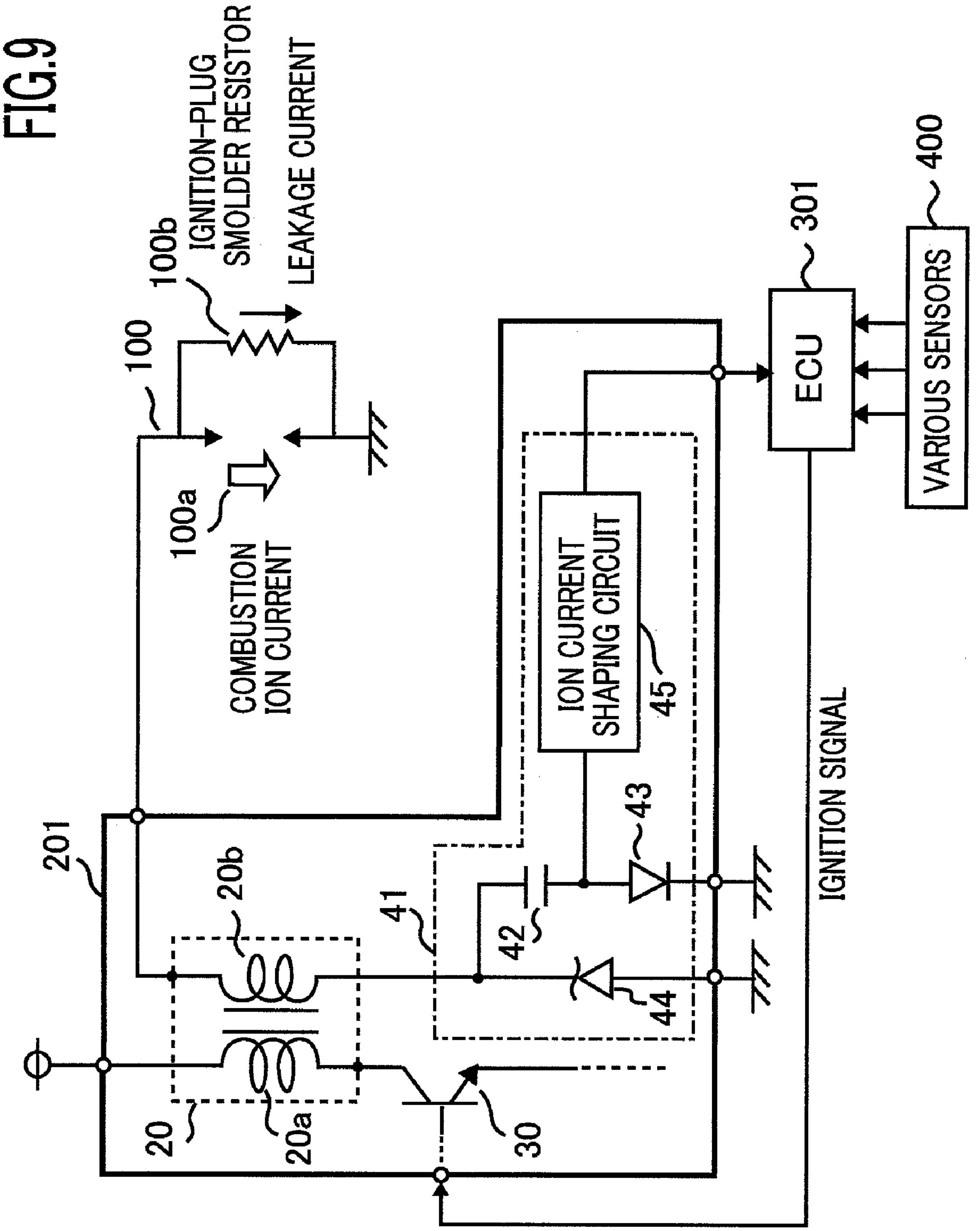
FIG. 9 is a diagram for explaining the configuration and the operation of a conventional ion-current detection device.
Figure 10:
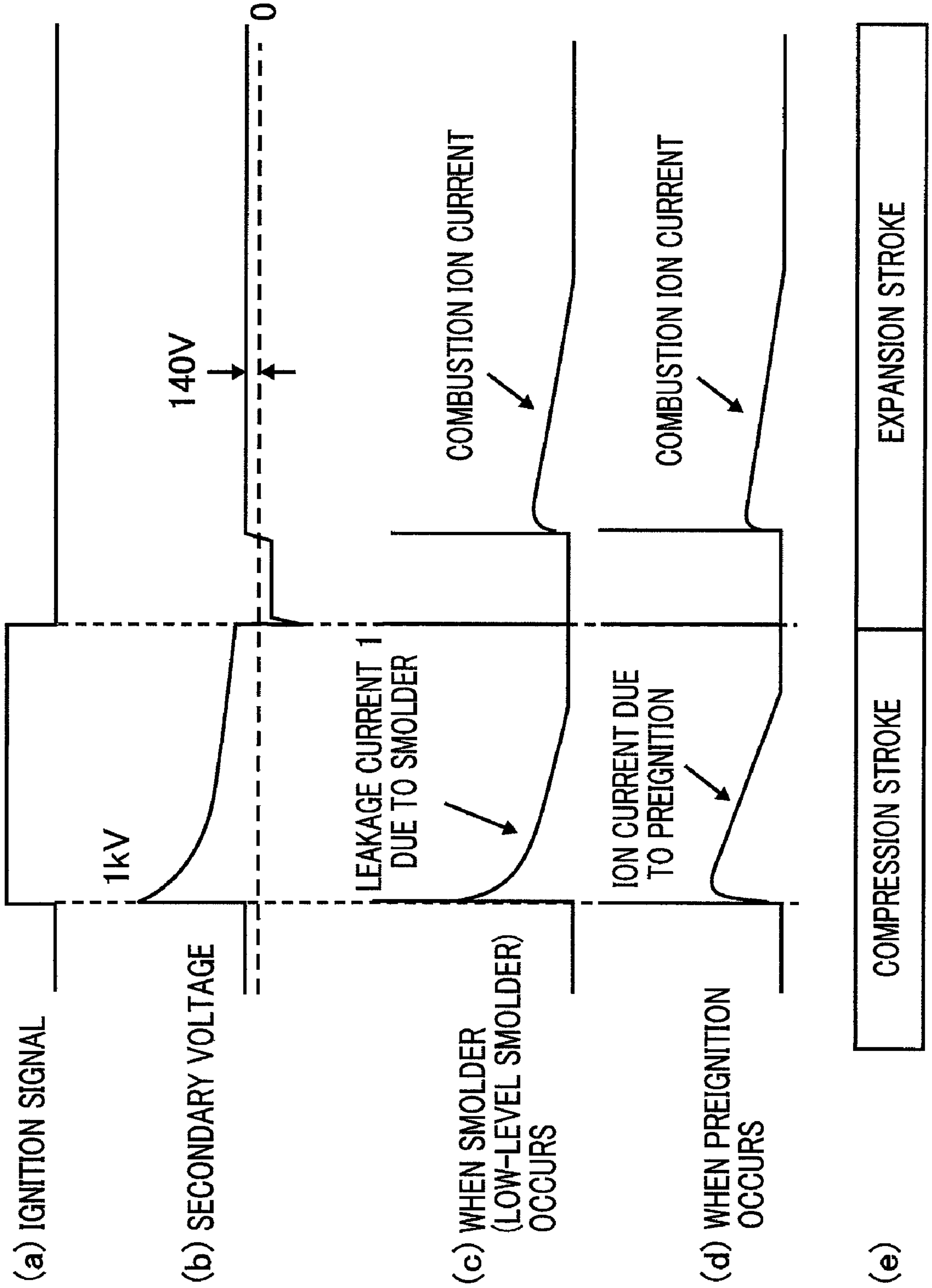
FIG. 10 is a set of charts representing the worst case of the relationship between an ion current and a leakage current due to a smolder when preignition is detected.
Figure 11:
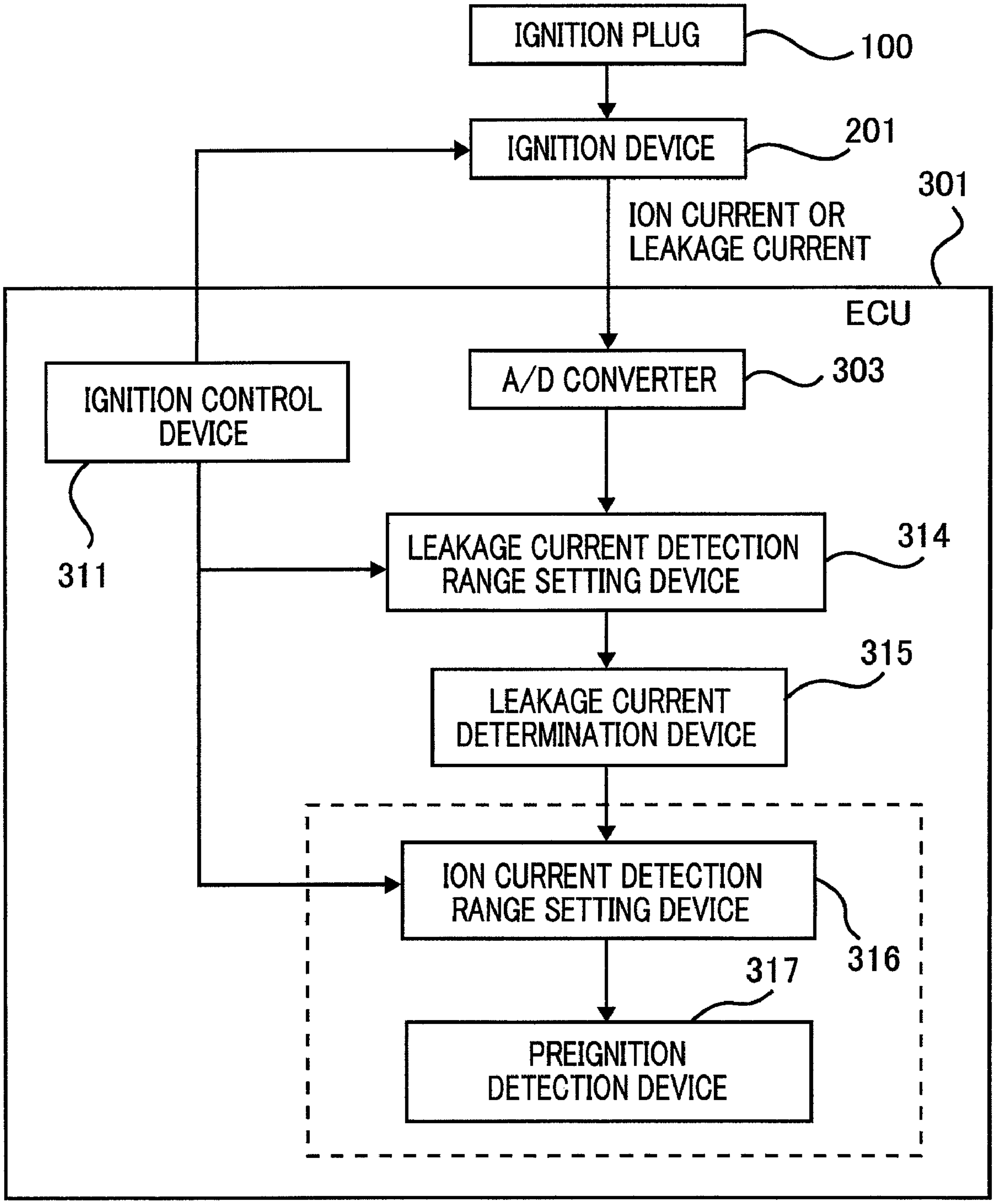
FIG. 11 is a diagram conceptually illustrating the configuration of a conventional internal-combustion-engine combustion condition detection apparatus.
Figure 12:
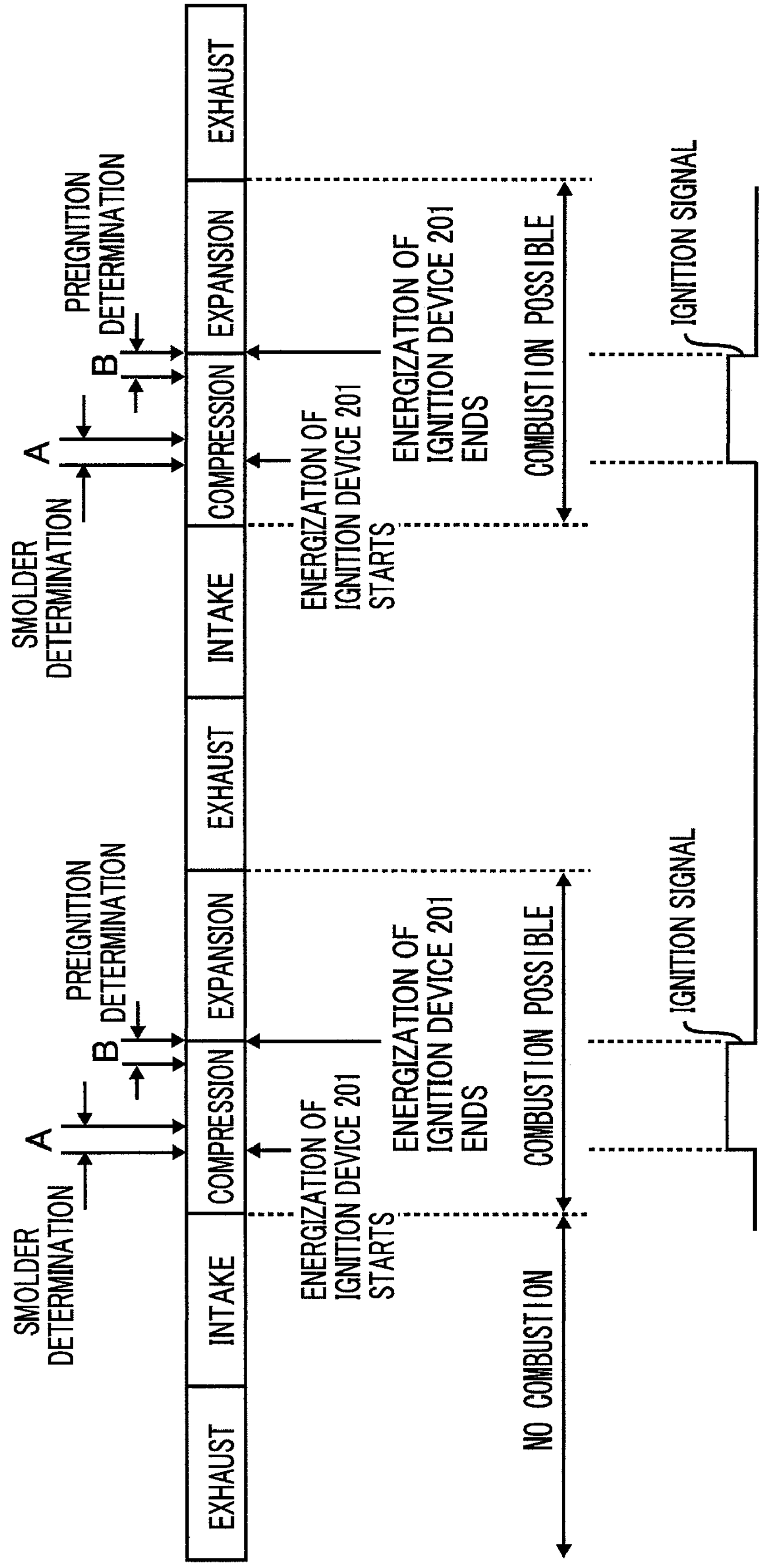
FIG. 12 is a chart for explaining timings for a smolder determination and a preignition determination in the conventional internal-combustion-engine combustion condition detection apparatus.

In addition, the ion-current detection device (means) 40 according to Embodiment 1 is the same as the conventional ion-current detection device 41 illustrated in FIG. 9 in terms of the basic function and the operation; however, the configuration thereof is simplified.

The ignition plug 100 is provided in the combustion chamber and connected to the negative-polarity end of the secondary coil 20*b* of the ignition coil 20.

The positive-polarity end of the primary coil 20*a* is connected to a power source and the negative-polarity end thereof is connected to the collector of the transistor 30 for current switching.

The emitter of the transistor 30 is connected to the ground, and the base thereof is connected to an ECU 300 that controls combustion.

In Embodiment 1, the ignition plug 100 is made to perform ignition during a combustion stroke in which a fuel-air mixture in a cylinder is compressed and combusted; the completion of combustion is determined based on whether or not an ion current occurs; and even during a non-combustion stroke (e.g., during a time period between air exhaust and air intake or in the second half of an expansion stroke after combustion), the ignition plug 100 is made to perform ignition.

In other words, the ignition device (ignition means) 200 generates a first ignition signal for making the ignition plug 100 perform ignition during a combustion stroke and a second ignition signal for making the ignition plug 100 perform ignition during a non-combustion stroke (refer to FIG. 3 described later).

The ion-current detection device (ion-current detection means) 40, configured with the diode 43 and the ion current shaping circuit (ion current shaping means) 45 that are connected to the positive-polarity end of the secondary coil 20*b*, detects the ion current 100*a* that occurs when the ignition plug 100 performs ignition based on the first ignition signal and a fuel-air mixture combusts.

The ion current shaping circuit (ion current shaping means) 45 converts an ion current detected by the ion-current detection device (ion-current detection means) 40 into a voltage and filters out noise components of a voltage-converted signal so as to shape the waveform thereof.

The ion-current detection device (ion-current detection means) 40 detects also a leakage current that flows through the resistor (smolder resistor) 100*b* formed of a carbon deposit when the ignition plug 100 performs ignition based on the second ignition signal.

Here, the configuration of the internal-combustion-engine combustion condition detection apparatus according to Embodiment 1 will be explained with reference to FIG. 1.

The ignition device (ignition means) 200 makes the ignition plug 100 perform ignition, based on the first and second ignition signals.

When the ignition plug 100 performs ignition based on the first ignition signal, a fuel-air mixture taken into the combustion chamber combusts.

However, when the ignition plug 100 performs ignition based on the second ignition signal, no fuel-air mixture exists in the combustion chamber because the engine is in a non-combustion stroke; therefore, combustion of the fuel-air mixture does not occur.

The ignition control device (ignition control means) 301 is to generate a control signal for controlling the operation of the ignition device (ignition means) 200 and includes the non-combustion-stroke ignition control device (non-combustion-stroke ignition control means) 302 that makes the ignition plug 100 perform ignition during a fuel-air mixture non-combustion stroke.

The ion-current detection device (ion-current detection means) 40 provided in the ignition device (ignition means) 200 detects an ion current that occurs when a fuel-air mixture ignited based on the first ignition signal combusts.

The ion current detection range setting device (ion current detection range setting means) 306 sets a detection range for an ion current to be detected by the ion-current detection device (ion-current detection means) 40.

The preignition detection device (preignition detection means) 307 detects preignition or a precursor phenomenon of preignition (e.g., a phenomenon in which the timing when an ion current occurs is advanced), based on an ion current detected within a detection range set by the ion current detection range setting device (ion current detection range setting means) 306. The leakage current detection range setting device (leakage current detection range setting means) 304 sets a detection range for a leakage current caused by a smolder in the ignition plug 100 that is made to perform ignition by the non-combustion-stroke ignition control device (non-combustion-stroke ignition control means) 302 provided in the ignition control device (ignition control means) 301.

The leakage current determination device (leakage current determination means) 305 determines whether or not a smolder in the ignition plug 100 exists, based on a current detected, within a detection range set by the leakage current detection range setting device 304, by the ion-current detection device (ion-current detection means) 40.

Embodiment 1 is characterized in that the leakage-current detection range set by the leakage current detection range setting device (leakage current detection range setting means) 304 is set within the non-combustion stroke.

Figure 3:
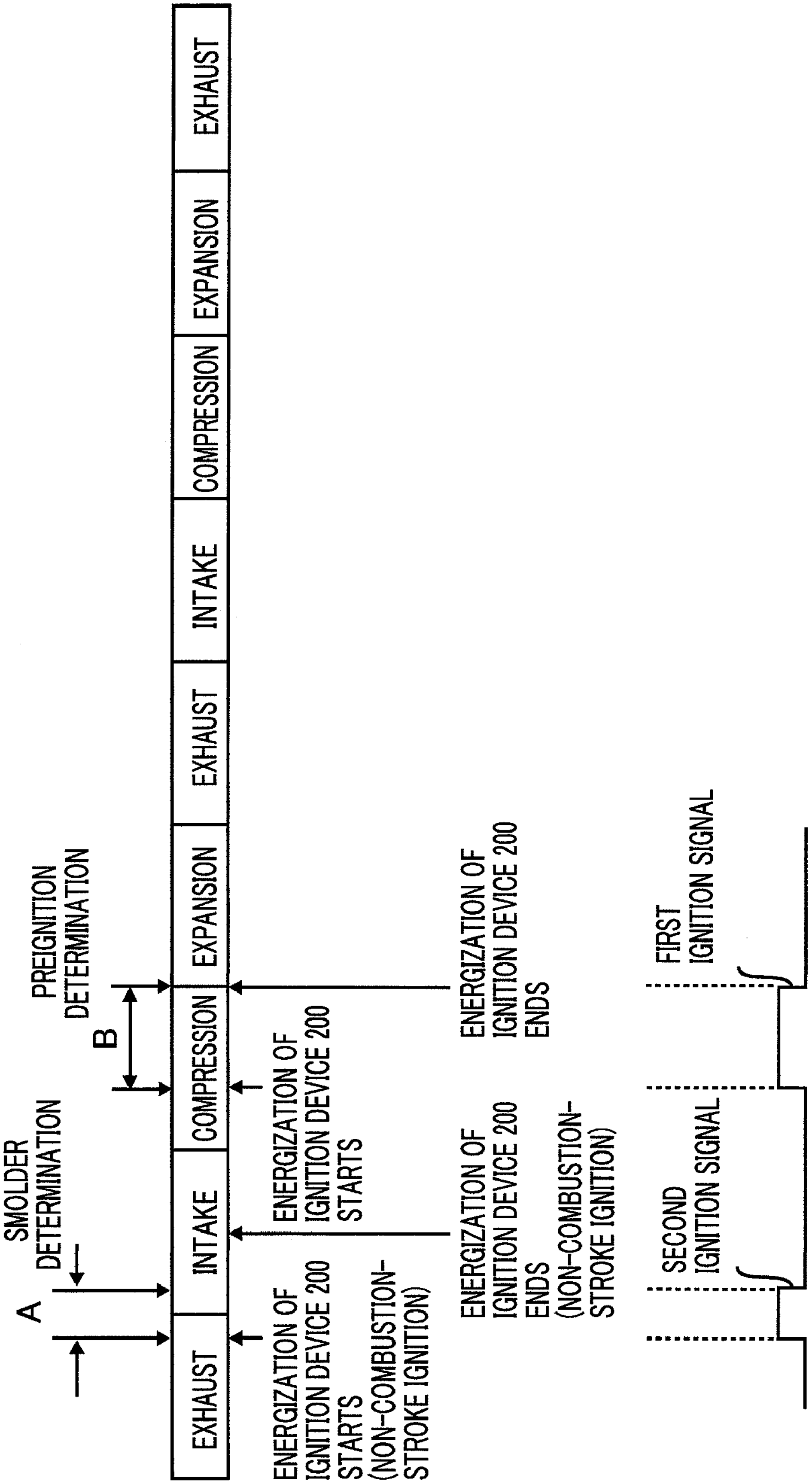
FIG. 3 is a chart for explaining timings for a smolder determination and a preignition determination according to Embodiment 1.

FIG. 3 is a chart for explaining the timings for a smolder determination and a preignition determination in the internal-combustion-engine combustion condition detection apparatus according to Embodiment 1.

As illustrated in FIG. 3, in Embodiment 1, a preignition determination is performed in a range corresponding to the first ignition signal for making the ignition plug 100 perform ignition during a combustion stroke, and a smolder determination (i.e., a determination whether or not a leakage current exists) is performed in a range corresponding to the second ignition signal for making the ignition plug 100 perform ignition during a non-combustion stroke.

As discussed above, the preignition determination and the smolder determination are performed in the different determination ranges; therefore, in the range for the smolder determination, only the smolder determination has to be performed, whereby the smolder determination range in the internal-combustion-engine combustion condition detection apparatus according to Embodiment 1 can be set to be wider than that in a conventional internal-combustion-engine combustion condition detection apparatus.

Similarly, in the range for the preignition determination, only the preignition determination has to be performed; therefore, the preignition determination range in the internal-combustion-engine combustion condition detection apparatus according to Embodiment 1 can be set to be wider than that in a conventional internal-combustion-engine combustion condition detection apparatus.

Accordingly, both the smolder detection and the preignition detection can securely be performed.

Moreover, because the leakage-current detection range and the ion-current detection range can be set wide, it is made possible to raise the accuracies of the smolder determination and the preignition determination.

In addition, in FIG. 3, "A" indicates a leakage-current detection range for a smolder determination, and "B" indicates an ion-current detection range for a preignition determination.

As described above, the internal-combustion-engine combustion condition detection apparatus according to Embodiment 1 is provided with the ignition means 200 that makes the ignition plug 100 ignite a fuel-air mixture taken into a combustion chamber; the ignition control means (301) that generates a control signal for controlling the operation of the ignition means 200; the ion-current detection means 40 that detects an ion current that occurs when a fuel-air mixture combusts; the ion current detection range setting means 306 that sets a detection range for an ion current detected by the ion-current detection means 40; the preignition detection means 307 that detects preignition or a precursor phenomenon of preignition, based on an ion current detected within a detection range set by the ion current detection range setting means 306; the leakage current detection range setting means 304 that sets a detection range for a leakage current caused by a smolder in the ignition plug 100; and the leakage current determination means 305 that determines whether or not a smolder in the ignition plug 100 exists, based on a current, within a detection range set by the leakage current detection range setting means 304, which is detected by the ion-current detection means 40. The ignition control means 301 includes the non-combustion-stroke ignition control means 302 that makes the ignition plug 100 perform ignition during a fuel-air mixture non-combustion stroke; the leakage-current detection range set by the leakage current detection range setting means 304 is set within the non-combustion stroke.

Accordingly, because, in Embodiment 1, the leakage-current detection range is set within the non-combustion stroke that is different from the ion-current detection range, both the smolder detection and the preignition detection can securely be performed. Moreover, because the leakage-current detection range and the ion-current detection range can be set wide, the accuracies of the smolder determination and the preignition determination can be raised.

Still moreover, in the case where the leakage current determination means 305 determines that an ignition-plug smolder exists, the preignition detection device 307 in the internal-combustion-engine combustion condition detection apparatus according to Embodiment 1 prohibits determination of preignition or a precursor phenomenon of preignition.

Therefore, the accuracy of the determination can further be raised.

Furthermore, a leakage-current detection range that is a critical mass for determination of a leakage current is allocated for an ignition energization duration that is set by the non-combustion-stroke ignition control means 302 in the internal-combustion-engine combustion condition detection apparatus according to Embodiment 1.

For example, supposing that the ignition energization duration for generating a breakdown voltage is 3 ms and the duration necessary for determination of a leakage current is 1 ms, the ignition energization duration may be set to 1 ms or only a duration of approximately 1 ms, which is the first half of a duration of 3 ms, may be allocated for the leakage-current detection range.

Accordingly, because the ignition energization duration in the non-combustion stroke is shortened, no energy is wastefully dissipated, and the probability of combustion during a non-combustion stroke can be reduced.

The leakage current detection range setting means 304 in the internal-combustion-engine combustion condition detection apparatus according to Embodiment 1 allocates an ignition energization initial duration, during which a secondary high voltage is generated across the secondary coil of the ignition coil of the ignition means 200, for the leakage-current detection range.

Because the induction voltage across the secondary coil is as high as 1 kV, even a low-level smolder causes a current (i.e., a leakage current) to flow through the smolder resistor 100*b*, and the current can be detected.

Accordingly, a low-level smolder can be detected.

Embodiment 2

A preignition detection device (preignition detection means) 307 in an internal-combustion-engine combustion condition detection apparatus according to Embodiment 2 is characterized by including a preignition detection threshold value setting means 308 that sets a threshold value for detecting preignition or a precursor phenomenon of preignition for an ion current in a detection range set by an ion current detection range setting device (ion current detection range setting means) 306, based on a current detected, in a detection range set by a leakage current detection range setting device (leakage current detection range setting means) 304, by an ion-current detection device (ion-current detection means) 40.

In Embodiment 2, a threshold value for detecting preignition or a precursor phenomenon of preignition is set as described above; therefore, an ion current due to preignition can be detected with the effect of a leakage current caused by a smolder being removed.

Accordingly, even in the case where, as in the state represented in FIG. 4(*d*) described later, a smolder and preignition occur, preignition can accurately be detected.

Additionally, the preignition detection threshold value setting device 308 stores the value of a current detected, in a detection range set by the leakage current detection range setting device 304, by the ion-current detection device 40, and sets a threshold value for detecting preignition or a precursor phenomenon of preignition to a value obtained by adding a predetermined margin to the stored current value.

In this case, because the amount of data (current value) to be stored is large, the accuracy of determination is high.

Additionally, the preignition detection threshold value setting device 308 stores the maximal value of a current detected, in a detection range set by the leakage current detection range setting device 304, by the ion-current detection device 40, and sets a threshold value for detecting preignition or a precursor phenomenon of preignition to a value obtained by adding a predetermined margin to the stored maximal current value.

In this case, because only the maximal value is stored, the accuracy of the determination is not satisfactory; however, the amount of data to be stored is small.

Figure 4:
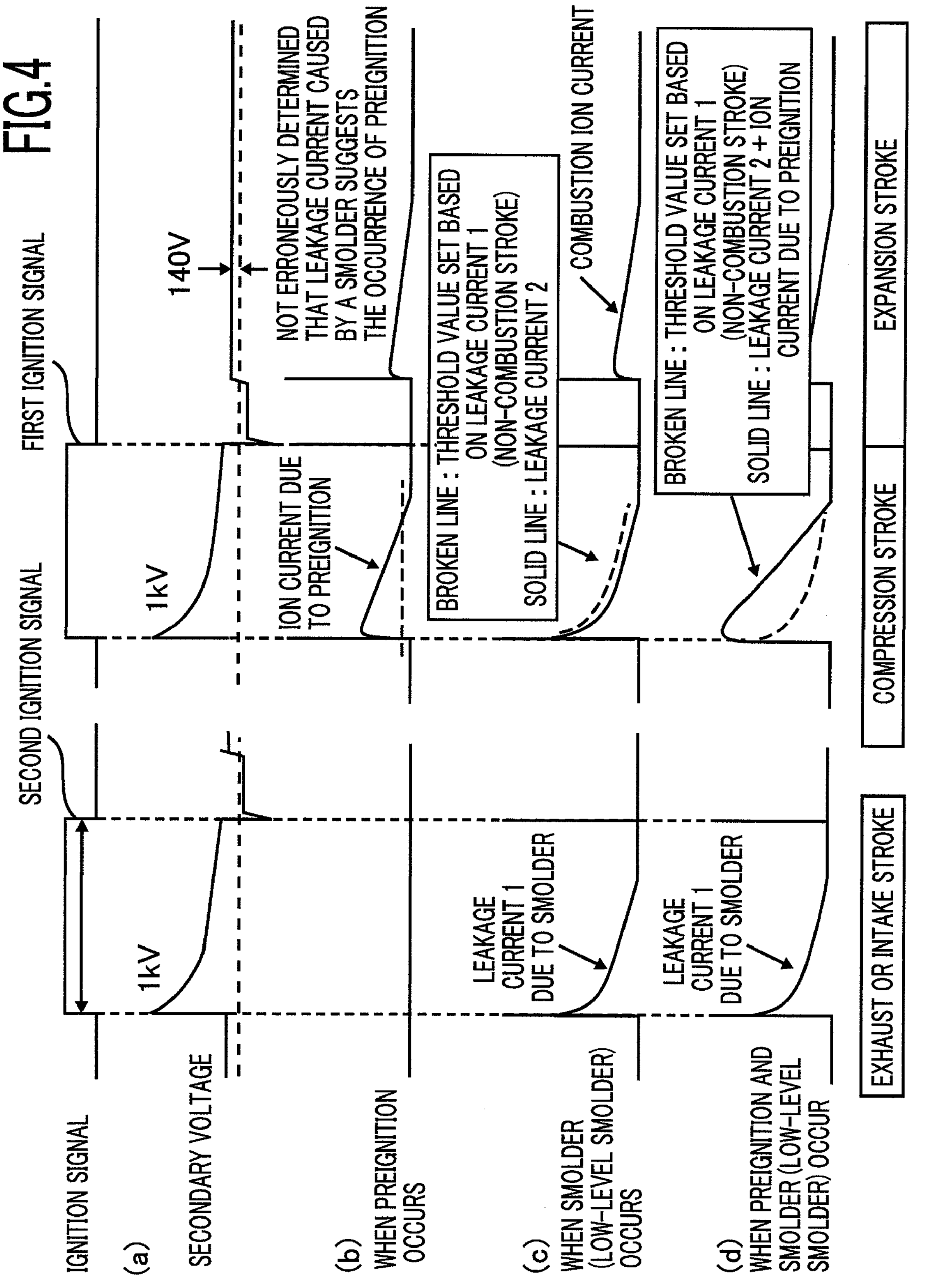
FIG. 4 is a set of charts for explaining a preignition detection method in an internal-combustion-engine combustion condition detection apparatus according to Embodiment 2.

FIG. 4 is a set of charts for explaining a pre-ignition detection method in the internal-combustion-engine combustion condition detection apparatus according to Embodiment 2.

Embodiment 2 is characterized by providing the preignition detection threshold value setting device (preignition detection threshold value setting means) 308 in the preignition detection device (preignition detection means) 307 of Embodiment 1 described above.

FIG. 4(*a*) represents timings for ignition signals and a secondary voltage (a voltage that occurs across the secondary coil of an ignition coil) and the waveforms thereof.

FIG. 4(*b*) represents the waveform of an ion current caused by preignition. Here, no erroneous determination is performed in which a leakage current caused by a smolder suggests the occurrence of preignition.

FIG. 4(*c*) represents the waveform of a leakage current when a low-level smolder occurs.

In addition, in FIG. 4(*c*), a leakage current 1 denotes a leakage current when a smolder occurs; a leakage current 2 denotes a leakage current when preignition occurs. Additionally, the broken line indicates a threshold value set based on the leakage current 1 (a leakage current during a non-combustion stroke).

FIG. 4(*d*) represents a case in which preignition and a smolder occur; the solid line in a range corresponding to the duration of the first ignition signal indicates the total of an ion current and the leakage current 2 that are caused by preignition; the broken line indicates a threshold value set based on the leakage current 1 (a leakage current during a non-combustion stroke).

Here, leakage current determination processing and preignition detection processing in the internal-combustion-engine combustion condition detection apparatus according to Embodiment 2 will be explained with reference to flowcharts.

Figure 5:
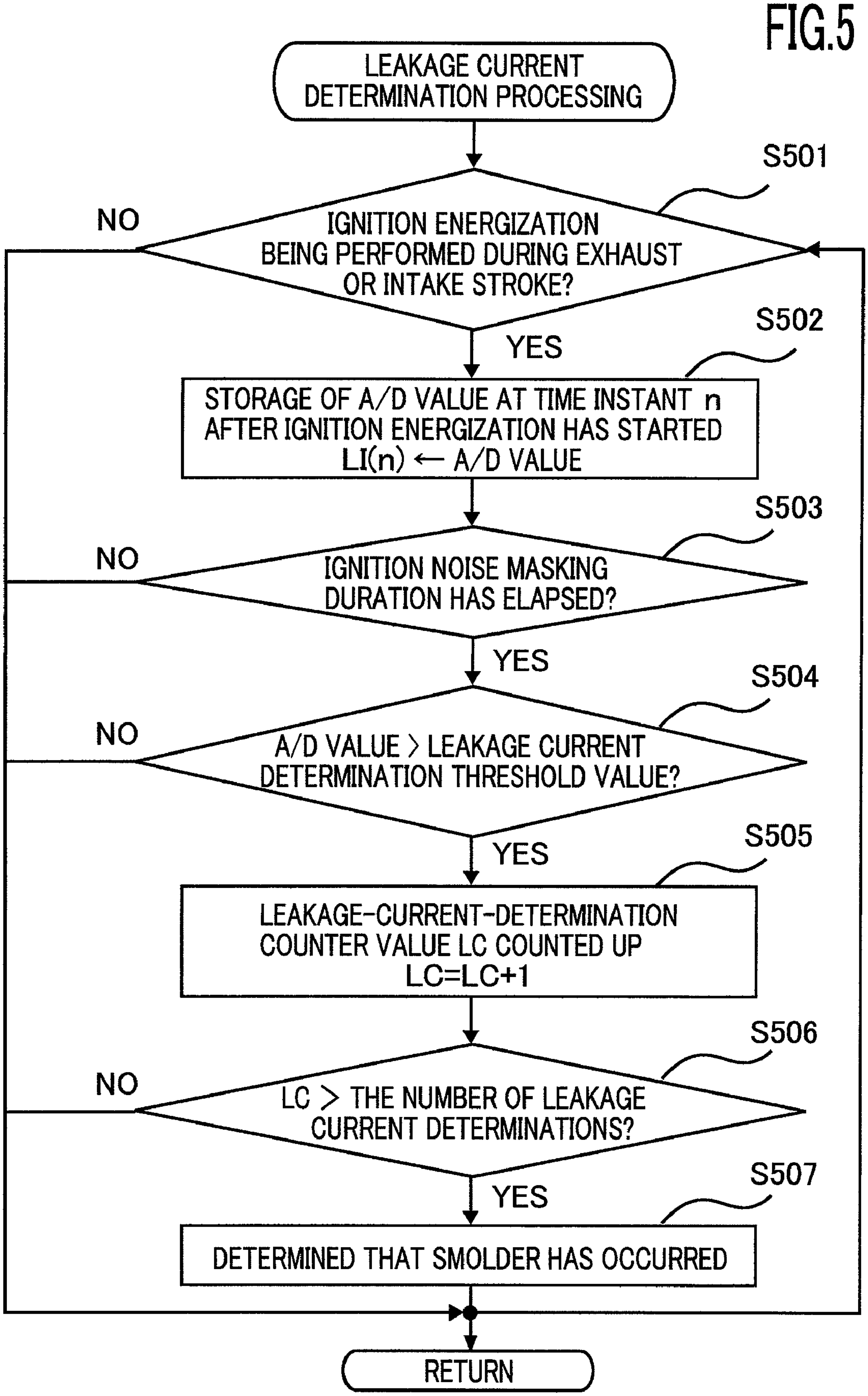
FIG. 5 is a flowchart for explaining leakage current determination processing according to Embodiment 2.

FIG. 5 is a flowchart for the leakage current determination processing according to Embodiment 2.

In addition, the leakage current determination processing described here is processing performed in the leakage current detection range setting device 304 and the leakage current determination device 305 in FIG. 1.

The processing flow up to a smolder occurrence determination will be explained with reference to FIG. 5.

In the first place, in the step S501, it is determined whether or not the ignition plug is being energized during the exhaust stroke or the intake stroke (i.e., during the non-combustion stroke).

In the case of "YES", in the step S502, an A/D value outputted from the A/D converter 303 (i.e., a value obtained by digitizing an ion current or a leakage current through the A/D converter 303) at a time instant n after the start of ignition energization is stored as ion-current data U(n).

In the case of "NO", the flow returns to the step S501.

In addition, U(n) is utilized also in the preignition detection processing described later.

Next, in the step S503, it is determined whether or not an ignition noise masking duration has elapsed.

In the case of "YES", the step S503 is followed by the step S504; in the case of "NO", the flow returns to the step S501.

In the step 504, it is determined whether or not the A/D value outputted from the A/D converter 303 is larger than a preset leakage current determination threshold value.

In the case of "YES" (in the case where the A/D value is larger than the preset leakage current determination threshold value), the step S504 is followed by the step S505; in the case of "NO", the flow returns to the step S501.

In the step S505, the counter value LC of a leakage current determination counter is counted up by one (LC=LC+1), and then the step S505 is followed by the step S506.

In the step 506, it is determined whether or not the counted-up value LC is larger than a preset number of leakage current determinations.

In the case of "YES", the step S506 is followed by the step S507, where it is determined that a smolder has occurred; in the case of "NO", the flow returns to the step S501.

Figure 6:
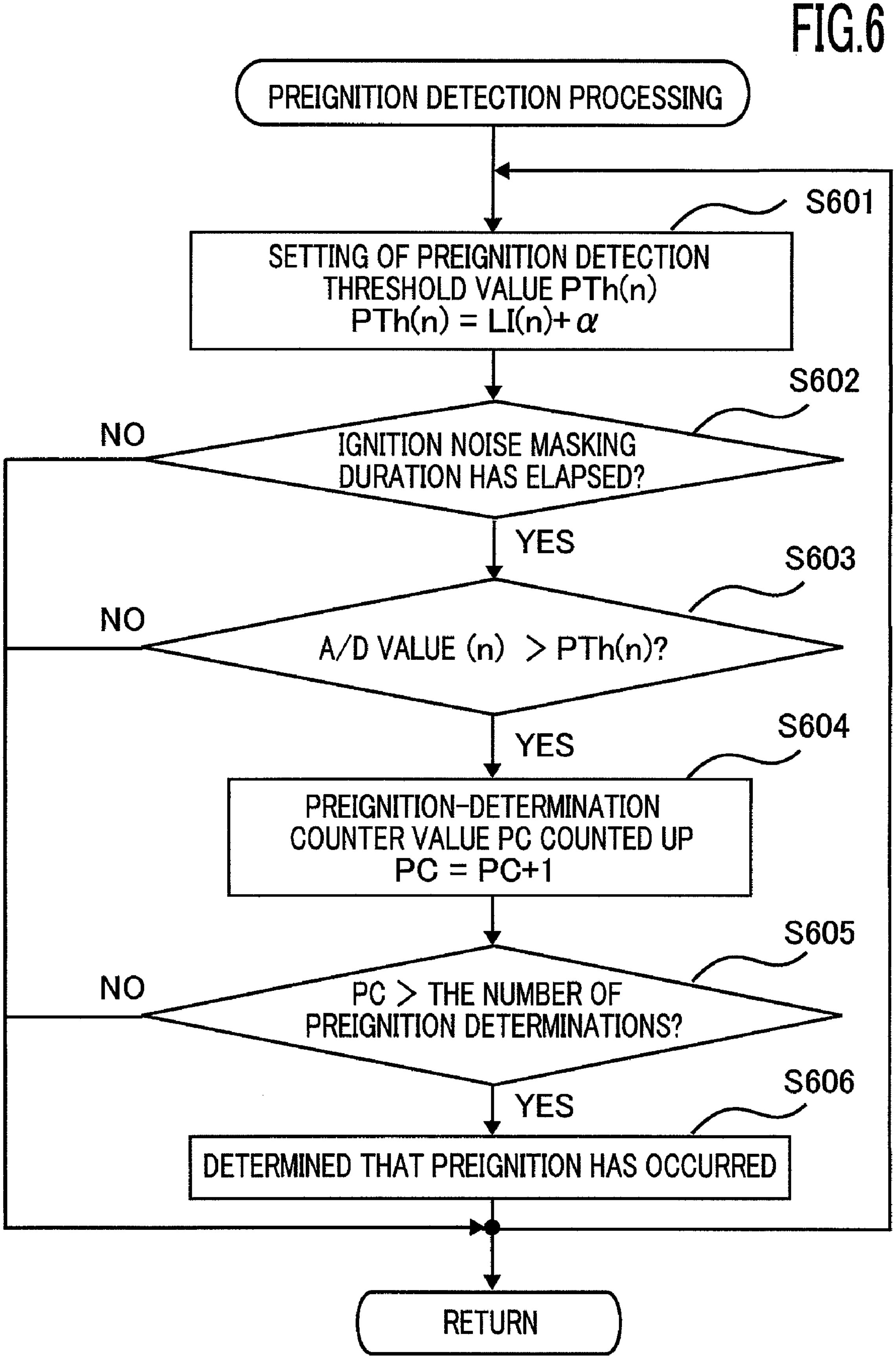
FIG. 6 is a flowchart for explaining preignition detection processing according to Embodiment 2.
Figure 7:
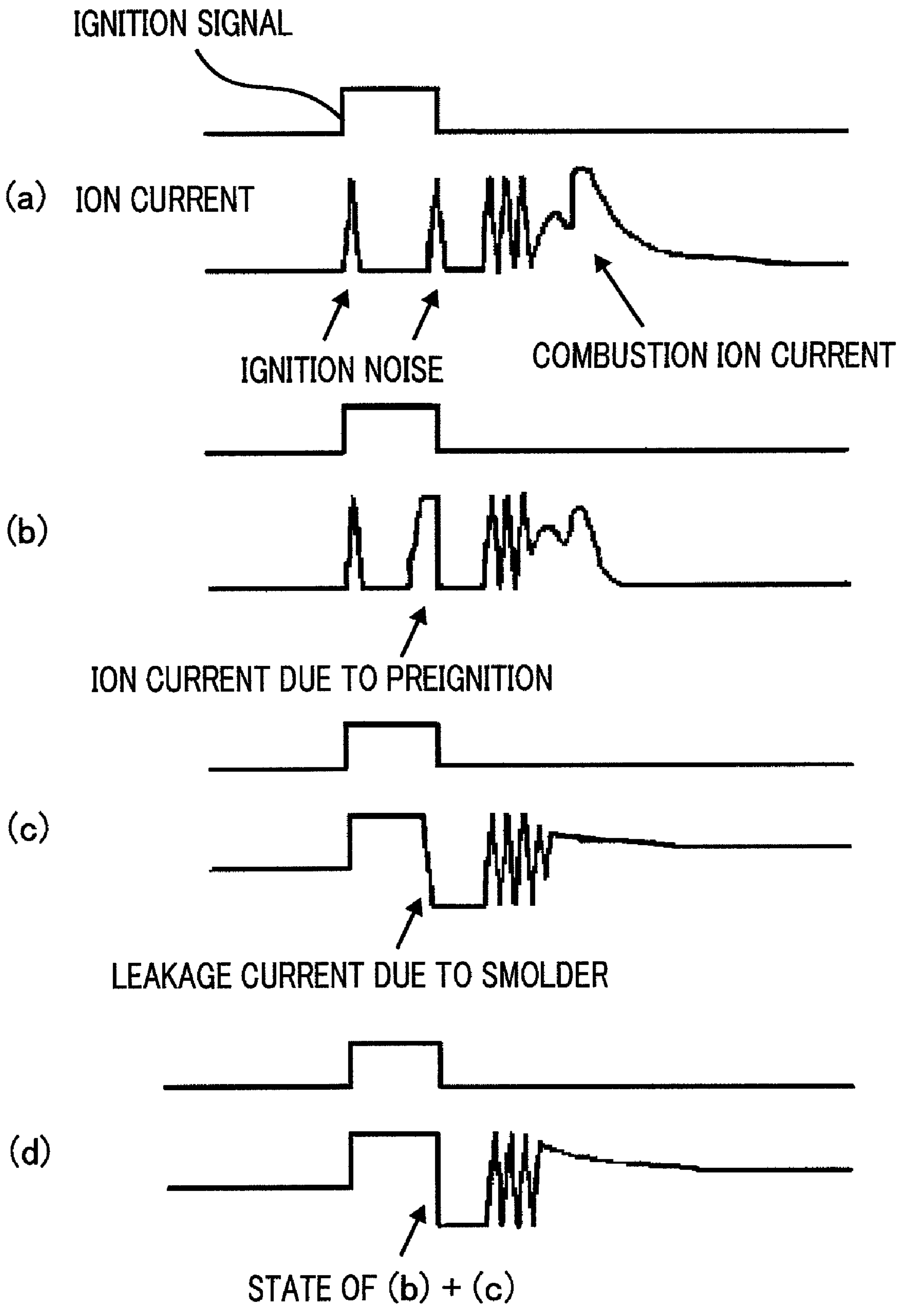
FIG. 7 is a set of charts for explaining problems in a conventional preignition detection.
Figure 8:
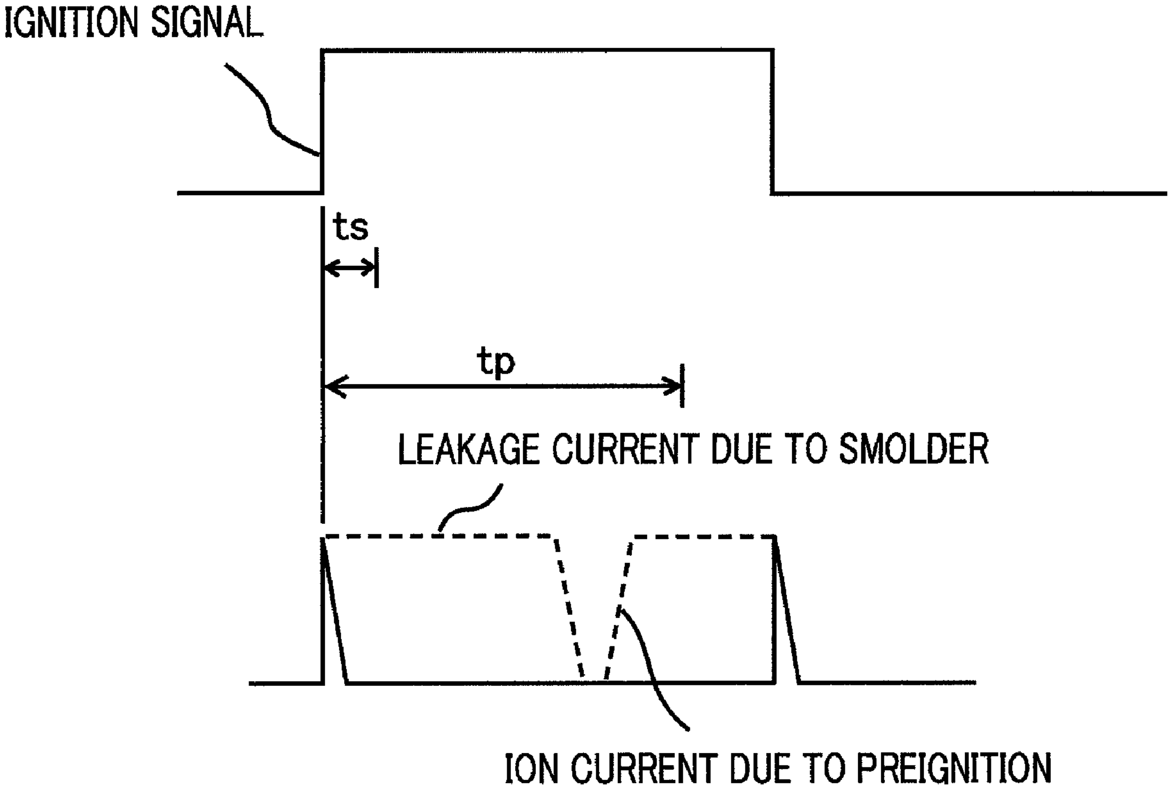
FIG. 8 is a chart for explaining a conventional preignition detection method.

FIG. 6 is a flowchart for the preignition detection processing.

In addition, the preignition detection processing described here is processing performed in the preignition detection device 307 (including the preignition detection threshold value setting device 308) in FIG. 1.

In the first place, in the step S601, a preignition detection threshold value PTh(n) is set.

Here, the preignition detection threshold value is given in the equation PTh(n)=U(n)+$\alpha$, where $\alpha$ is a predetermined margin.

Next, the step S601 is followed by the step S602, where it is determined whether or not the ignition noise masking duration has elapsed.

In the case of "YES", the step S602 is followed by the step S603; in the case of "NO", the flow returns to the step S601.

In the step 603, it is determined whether or not the A/D value (n) outputted from the A/D converter 303 is larger than a preset preignition detection threshold value PTh(n).

In the case of "YES" (in the case where the A/D value is larger than the preset preignition detection threshold value), the step S603 is followed by the step S604; in the case of "NO", the flow returns to the step S601.

In the step 604, the counter value PC of a preignition determination counter is counted up by one (PC=PC+1), and then the step S604 is followed by the step S605.

In the step 605, it is determined whether or not the counted-up value PC is larger than a preset number of preignition determinations.

In the case of "YES" (in the case where the counted-up value PC is larger than the preset number of preignition determinations), the step S605 is followed by the step S606, where it is determined that preignition has occurred; in the case of "NO", the flow returns to the step S601.

As described above, in Embodiment 2, the preignition detection device 307 includes the preignition detection threshold value setting means 308 that sets a threshold value for detecting preignition or a precursor phenomenon of preignition in a detection range set by the ion current detection range setting means 306, based on a current detected, in a detection range set by the leakage current detection range setting means 304, by the ion-current detection means 40.

Accordingly, in Embodiment 2, a threshold value for detecting preignition or a precursor phenomenon of preignition is set; therefore, an ion current due to the occurrence of preignition can be detected with the effect of a leakage current caused by a smolder being removed, whereby, even in the case where a smolder and preignition occur, preignition can accurately be detected.

Additionally, in Embodiment 2, the preignition detection threshold value setting means 308 stores the value of a current detected, in a detection range set by the leakage current detection range setting device 304, by the ion-current detection device 40 and sets a threshold value for detecting preignition or a precursor phenomenon of preignition to a value obtained by adding a predetermined margin (i.e., $\alpha$) to the stored current value (i.e., U(n)).

Accordingly, in this case, because the amount of data (current value) to be stored is large, the accuracy of determination of preignition is high.

Additionally, in Embodiment 2, the preignition detection threshold value setting means 308 stores the maximal value of a current detected, in a detection range set by the leakage current detection range setting means 304, by the ion-current detection means 40, and sets a threshold value for detecting preignition or a precursor phenomenon of preignition to a value obtained by adding a predetermined margin to the stored maximal current value.

Accordingly, because, in this case, only the maximal value is stored, the accuracy of the determination is not satisfactory; however, the amount of data to be stored is small.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An internal-combustion-engine combustion condition detection apparatus comprising:

an ignition means for activating an ignition plug that ignites a fuel-air mixture taken into a combustion chamber;

an ignition control means for generating a control signal for controlling operation of the ignition means;

an ion-current detection means for detecting an ion current that occurs when the fuel-air mixture combusts;

an ion current detection range setting means for setting a detection range for an ion current to be detected by the ion-current detection means;

a preignition detection means for detecting preignition or a precursor phenomenon of preignition, based on an ion current detected within a detection range set by the ion current detection range setting means;

a leakage current detection range setting means for setting a detection range for a leakage current caused by an ignition-plug smolder; and a leakage current determination means for determining whether or not an ignition-plug smolder exists, based on a current detected, within a detection range set by the leakage current detection range setting means, by the ion-current detection means, wherein the ignition control means includes a non-combustion-stroke ignition control means that makes the ignition plug perform ignition during a fuel-air mixture non-combustion stroke, and wherein the leakage-current detection range set by the leakage current detection range setting means is set within the non-combustion stroke.

2. The internal-combustion-engine combustion condition detection apparatus according to claim 1, wherein, in the case where the leakage current determination means determines that an ignition-plug smolder exists, the preignition detection means prohibits determination of preignition or a precursor phenomenon of preignition.

3. The internal-combustion-engine combustion condition detection apparatus according to claim 1, wherein a leakage-current detection range that is a critical mass for determination of a leakage current is allocated for an ignition energization duration set by the non-combustion-stroke ignition control means.

4. The internal-combustion-engine combustion condition detection apparatus according to claim 1, wherein the leakage current detection range setting means allocates an ignition energization initial duration, during which a secondary high voltage is generated across a secondary coil of an ignition coil of the ignition means, for a leakage-current detection range.

5. An internal-combustion-engine combustion condition detection method comprising:

an ignition step of making an ignition plug ignite a fuel-air mixture taken into a combustion chamber;

an ignition control step of generating a control signal for controlling operation in the ignition step;

an ion-current detection step of detecting an ion current that occurs when the fuel-air mixture combusts;

an ion current detection range setting step of setting a detection range for an ion current to be detected in the ion-current detection step;

a preignition detection step of detecting preignition or a precursor phenomenon of preignition, based on an ion current detected within a detection range set in the ion current detection range setting step;

a leakage current detection range setting step of setting a detection range for a leakage current caused by an ignition-plug smolder; and a leakage current determination step of determining whether or not an ignition-plug smolder exists, based on a current detected, within a detection range set in the leakage current detection range setting step, by the ion-current detection step, wherein the ignition control step includes a non-combustion-stroke ignition control step of making the ignition plug perform ignition during a fuel-air mixture non-combustion stroke, and wherein the leakage-current detection range set in the leakage current detection range setting step is set within the non-combustion stroke.

* * * * *